(12) United States Patent
Ahluwalia

(10) Patent No.: US 8,886,192 B2
(45) Date of Patent: *Nov. 11, 2014

(54) COMMUNICATIONS SYSTEM

(71) Applicant: NEC Corporation, Tokyo (JP)

(72) Inventor: Jagdeep Singh Ahluwalia, Sutton (GB)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/678,875

(22) Filed: Nov. 16, 2012

(65) Prior Publication Data

US 2013/0165135 A1 Jun. 27, 2013

Related U.S. Application Data

(63) Continuation of application No. 12/735,418, filed as application No. PCT/JP2009/052120 on Feb. 3, 2009, now Pat. No. 8,442,547.

(30) Foreign Application Priority Data

Feb. 4, 2008 (GB) .................... 0802023.2

(51) Int. Cl.
H04W 36/00 (2009.01)
H04W 72/04 (2009.01)
H04W 24/10 (2009.01)
H04W 36/22 (2009.01)
H04W 28/08 (2009.01)
H04W 92/20 (2009.01)

(52) U.S. Cl.
CPC .............. H04W 36/22 (2013.01); H04W 92/20 (2013.01); H04W 72/0486 (2013.01); H04W 24/10 (2013.01); H04W 28/08 (2013.01)
USPC ............................ 455/436; 455/437; 455/438

(58) Field of Classification Search
CPC ... H04W 28/08; H04W 28/085; H04W 28/16; H04W 36/22; H04W 48/06
USPC ........... 455/432.3, 435.1, 436, 438, 445, 450, 455/451, 452.1, 452.2, 453, 550.1, 561
See application file for complete search history.

(56) References Cited

U.S. PATENT DOCUMENTS 7,610,378 B2 10/2009 Teodosiu et al.
2005/0026615 A1 2/2005 Kim
(Continued)

FOREIGN PATENT DOCUMENTS

CN 1399435 A 2/2003
CN 1780170 A 5/2006
(Continued)

OTHER PUBLICATIONS

Office Action dated Mar. 8, 2013 in U.S. Appl. No. 13/678,831.

(Continued)

Primary Examiner — Jean Gelin
(74) Attorney, Agent, or Firm — McGinn IP Law Group, PLLC

(57) ABSTRACT

A method performed by a EUTRAN base station, the method including generating a request for resource status information. The request defines a periodicity when update messages including said resource status information should be sent. The method further including sending the generated request to a neighboring EUTRAN base station, receiving one or more resource status update messages from the neighboring base station in response to the requested resource status information in accordance with said defined periodicity, and performing load balancing operations in dependence upon the received one or more resource status update messages.

28 Claims, 7 Drawing Sheets

(56) References Cited

U.S. PATENT DOCUMENTS

| | | |
|---|---|---|
| 2008/0014957 A1 | 1/2008 | Ore |
| 2008/0072301 A1 | 3/2008 | Chia et al. |
| 2008/0102896 A1 | 5/2008 | Wang et al. |
| 2008/0165727 A1 | 7/2008 | Xiaoben et al. |
| 2008/0242301 A1 | 10/2008 | Osterling et al. |
| 2010/0291943 A1 | 11/2010 | Mihaly et al. |

FOREIGN PATENT DOCUMENTS

| | | |
|---|---|---|
| GB | 2359701 A | 8/2001 |
| WO | WO 2006/136422 | 12/2006 |

OTHER PUBLICATIONS

Office Action dated Apr. 2, 2013 in U.S. Appl. No. 13/678,883.
Chinese Office Action and Search Report dated Apr. 23, 2013 with English translation of Search Report thereof.
Office Action dated Jul. 23, 2013 in U.S. Appl. No. 13/678,831.
Office Action dated Sep. 19, 2013 in U.S. Appl. No. 13/678,824.
3GPP TS 25.423 V7.7.0 (Dec. 2007), 3rd Generation Partnership Project; Technical Specification Group Radio Access Network; UTRAN Iur interface RNSAP signalling (Release 7), Sophia Antipolis Valbonne—France, Dec. 2007.
NEC:"Details on Load Balancing and ICIC Signaling Mechanism", 3GPP TSG-RAN WG3#59, R3-080388, Sorrento, Italy, Feb. 11-15, 2008.
Orange:"On Traffic Load Reporting in LTE," TSG-RAN WG3#51bis, R3-060426, Sophia Anapolis, France, Apr. 3-5, 2006.
Ericsson:"Inter-eNB Measurement Exchange for Handovers in E-UTRAN," 3GPP TSG-RAN WG3 Meeting #53bis, R3-061502, Seul, Korea, Oct. 10-13, 2006.
NEC: "Load Balancing Signaling and associates SON,"3GPP TSG-RAN WG2#61, R2-081175 Sorrento, Italy, Feb. 11-15, 2008.
Sadayuki Abeta, LTE: (Draft) "Reply LS on Load balancing,"3GPP TSG-RAN WG1 Meeting #51bis, R1-080601, Seville, Spain, Jan. 14-18, 2008.
3GPP TS 36.423 V8.0.0, $3^{rd}$ Generation Partnership Project; Technical Specification Group Radio Access Network; Evolved Universal Terrestrial Radio Access Network (EUTRAN); X2 application protocol (X2AP) (Release 8), Sophia Anapolis Valibonne, France, Dec. 2007.
Korean Office Action dated Sep. 18, 2012.
3GPP TSG RAN WG1 Meeting #51bis, Sevilla, Spain, Jan. 14-18, 2008.
Office Action dated Apr. 19, 2013 in U.S. Appl. No. 13/678,824.

Simple Resource Status Update procedure

Master Slave based Resource Status Update Procedure

Common Measurement like Resource Status Update Procedure (Successful Initiation)

Common Measurement like Resource Status Update Procedure (Unsuccessful Initiation)

Common Measurement like Resource Status Update Procedure (Termination)

COMMUNICATIONS SYSTEM

INCORPORATION BY REFERENCE

The present application is a Continuation Application of U.S. patent application Ser. No. 12/735,418, filed on Jul. 14, 2010 now U.S. Pat. No. 8,442,547, which is a National Stage Application of International Application No. PCT/JP2009/052120, filed on Feb. 3, 2009, which is based on the United Kingdom Patent Application No. 0802023.2, filed on Feb. 4, 2008, the entire contents of which is incorporated herein by reference.

DESCRIPTION

1. Technical Field

The present invention relates to mobile telecommunication networks, particularly but not exclusively networks operating according to the 3GPP standards or equivalents or derivatives thereof. The invention has particular although not exclusive relevance to the Long Term Evolution (LTE) of UTRAN (called Evolved Universal Radio Access Network (E-UTRAN)).

2. Background Art

In a mobile telephone network, load balancing is required to share scarcely available radio resources and the processing load between available base stations (referred to as eNBs in E-UTRAN). In order that this load balancing can take place, load measurements are made by the base stations and shared with the neighbouring base stations, so that decisions on load balancing can be taken. In the RAN1#51B is meeting in Seville 14 to 18 Jan. 2008, the load balancing mechanism was discussed. In particular, RAN1 discussed the physical layer measurements needed to support efficient load balancing and agreed that the measurements of the physical resource block usage in the uplink and the downlink are relevant for load balancing. They have proposed the following four different measurements for this purpose:

1) Physical resource block usage for GBR (real time traffic) on UL
2) Physical resource block usage for non-real traffic on UL
3) Physical resource block usage for GBR (real time) traffic on DL
4) Physical resource block usage for non-real time traffic on DL All these measurements are defined as a ratio (percentage) of the used Physical Resource Blocks (PRBs) for a type of traffic over the available PRBs in the same direction over a certain time interval, and are measured per cell. Any non-scheduled transmissions and retransmissions should also be counted as used.

Further, RAN 1 believes that it would be sufficient if this control is done at a periodicity in the order of seconds to minutes, or even at a slower rate depending on the expected traffic fluctuation such as for busy hours.

However, details of the signalling of this information between the base stations for load balancing have yet to be defined.

Although for efficiency of understanding for those of skill in the art the invention will be described in detail in the context of a 3G system, the principles of the handover procedure can be applied to other systems, e.g. other COMA or wireless systems in which mobile devices or User Equipment (UE) communicate with one of several other devices (corresponding to eNB) with the corresponding elements of the system changed as required.

DISCLOSURE OF INVENTON

Embodiments of the present invention aim to provide efficient techniques for signaling these measurements between the base stations.

According to one exemplary aspect, the present invention provides a method performed by a EUTRAN base station comprising: sending a request for load balancing measurements to a neighbouring EUTRAN base station; receiving one or more resource status update messages from the neighbouring EUTRAN base station in response to the requested resource status information; and performing load balancing operations in dependence upon the received one or more resource status messages.

The base station may also use load balancing measurements for itself and use these also for performing the load balancing operations. These measurements may be measured directly by the base station.

The one or more status update messages may include data identifying the physical resource block usage for real time and/or non-real time traffic on the uplink or the downlink.

The requesting base station may request the other base station to provide the status updates at a specific time, periodically or in response to one or more specific events. The event may be, for example, when usage of a resource by the neighbouring base station exceeds a defined threshold and/or when the uplink interference level exceeds a defined threshold.

The request preferably defines a time period over which the load measurements are obtained. Additionally, where the neighbouring base station has a plurality of associated cells, the request may identify a subset of those cells for which the measurements are requested.

The base station can control handover of one or more associated mobile communication devices to another cell or base station in dependence upon the one or more received resource status update messages. It can do this, for example, by dynamically controlling Handover and Cell re-selection parameters in dependence upon the one or more received resource status update messages.

This exemplary aspect of the invention also provides a method performed by a EUTRAN base station comprising: receiving a request for resource status information from a neighbouring EUTRAN base station; generating one or more resource status update messages including one or more load balancing measurements; and sending the generated one or more resource status update messages to the requesting base station.

The invention also provides corresponding base stations for performing the above methods.

The invention provides, for all methods disclosed, corresponding computer programs or computer program products for execution on corresponding equipment, the equipment itself (user equipment, nodes or components thereof) and methods of updating the equipment.

An exemplary embodiment of the invention will now be described, by way of example, with reference to the accompanying drawings in which:

BEST MODE FOR CARRYING OUT THE INVENTION

Overview

Figure 1:
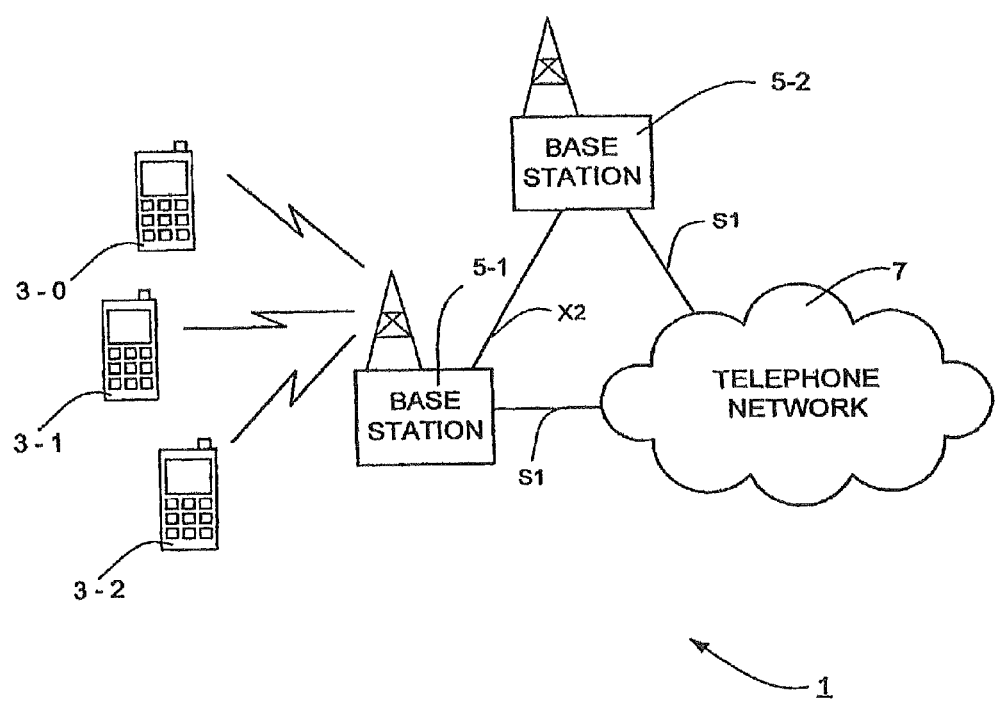
FIG. 1 schematically illustrates a mobile telecommunication system of a type to which the exemplary embodiment is applicable.

FIG. 1 schematically illustrates a mobile (cellular) telecommunication system 1 in which users of mobile telephones (MT) 3-0, 3-1, and 3-2 can communicate with other users (not shown) via one of the base stations 5-1 or 5-2 and a telephone network 7. A number of uplink and downlink communications resources (sub-carriers, time slots etc) are available for the wireless link between the mobile telephones 3 and the base stations 5. In this exemplary embodiment, the base stations 5 allocate downlink resources to each mobile telephone 3 depending on the amount of data to be sent to the mobile telephone 3. Similarly, the base stations 5 allocate uplink resources to each mobile telephone 3 depending on the amount and type of data the mobile telephone 3 has to send to the base station 5.

Each of the Base stations 5 includes an "S1" interface for interfacing with the core telephone network 7 and an "X2" interface for interfacing with neighbouring base stations 5. Load balancing measurements made by the base stations 5 are sent to the neighbouring base stations 5 over the X2 interface. In this exemplary embodiment, the measurement reports are transmitted between the base stations 5 using a Master/Slave signalling mechanism, in which a Master base station 5-1 requests measurement reports from a Slave base station 5-2 in a defined format and periodicity etc, and in which the Slave base station 5-2 responds in the requested manner. Each base station 5 will act as Master when gathering load balancing information from neighbouring base stations 5 and as a Slave when providing its own load balancing information to neighbouring base stations 5. In this way, each base station 5 can obtain the load balancing information it wants, at the periodicity it wants and in the format it wants. This makes interoperability between different makes of base station 5 easier and will significantly reduce unnecessary traffic over the X2 interface.

Base Station

Figure 2:
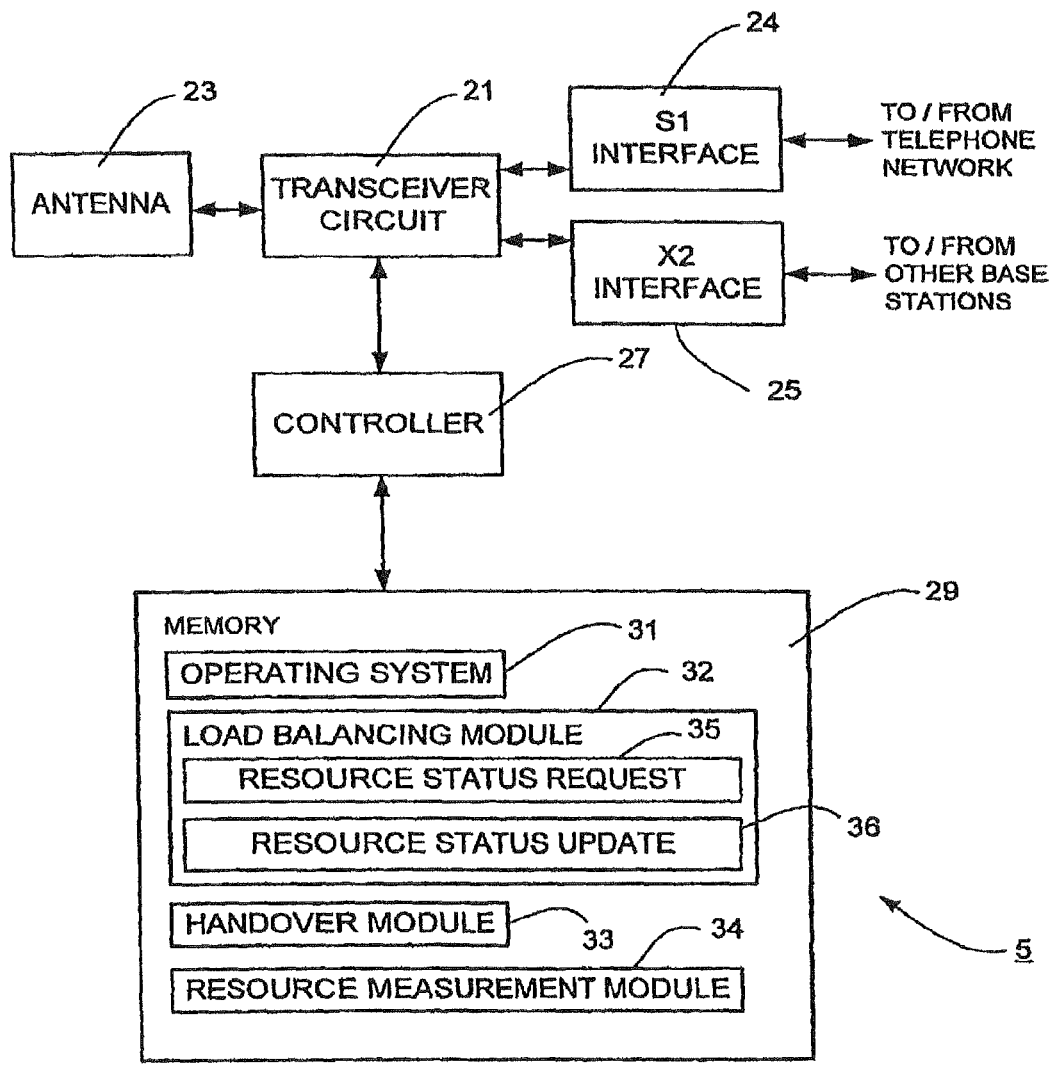
FIG. 2 schematically illustrates a base station forming part of the system shown in FIG. 1.

FIG. 2 is a block diagram illustrating the main components of each of the base stations 5 used in this exemplary embodiment. As shown, each base station 5 includes a transceiver circuit 21 which is operable to transmit signals to and to receive signals from i) the mobile telephones 3 via one or more antennae 23; ii) the telephone network 7 via the S1 interface 24; and iii) other base stations 5 via the X2 interface 25. A controller 27 controls the operation of the transceiver circuit 21 in accordance with software stored in memory 29. The software includes, among other things, an operating system 31, a load balancing module 32, a handover module 33 and a resource measurement module 34. The load balancing module 32 has a resource status request module 35 for issuing status requests to other base stations 5 requesting information on the load in the other base station 5; and a resource status update module 36 for providing load information to other base stations 5 when requested to do so. The Handover module 33 is responsible for controlling handover of mobile telephones 3 to or from the base station 5. The Resource measurement module 34 is responsible for obtaining the load information discussed above (which is sent to other base stations 5 by the resource status update module 36), ie:

1) Physical resource block usage for GBR (real time traffic) on UL;

2) Physical resource block usage for non-real traffic on UL;

3) Physical resource block usage for GBR (real time) traffic on DL; and

4) Physical resource block usage for non-real time traffic on DL.

In the above description, the base station 5 is described for ease of understanding as having a number of discrete modules (such as the load balancing module, handover module, resource measurement module etc). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Load Balancing—Signalling Mechanism

Figure 3A:
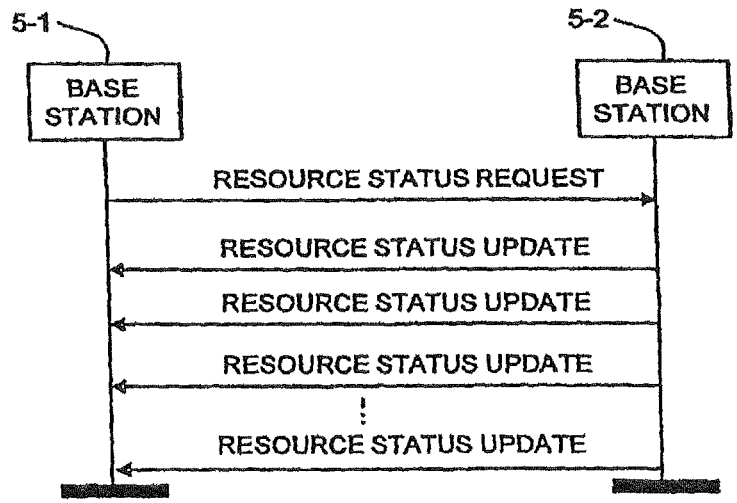
FIG. 3a schematically illustrates a signalling method for signalling the load balancing measurements between two base stations.

In this exemplary embodiment, the base stations 5 selectively provide load information when requested by their neighbours. A base station 5-1 may request a neighbouring base station 5-2 to send load information in the format it likes (based on the Radio Resource Management (ARM) algorithm that is implemented by the requesting base station 5-1). For example the requesting base station 5-1 may indicate in a Resource Status Request (generated by the resource status request module 35) to the neighbouring base stations 5-2 if it needs load information to be reported just once, or periodically, or in an event driven fashion whenever any of one or more events occurs. The base station 5-2 that receives the request then responds at the appropriate time/event in a Resource Status Update (generated by the Resource status update module 36). In this way, the requesting base station 5-1 is acting as a "Master" and the responding base station 5-2 is acting as a "Slave". The scheduling used is illustrated in FIG. 3a.

Details of Resource Status Request Message

The Master base station 5-1 will send a Resource Status Request to the Slave base station 5-2 requesting it to report its physical resource block usage information. The Resource Status Request will include a Reporting Characteristics Information Element (IE), which indicates whether this reporting shall be once, or periodically, or event driven, in which case the event is also specified. If the Reporting Characteristics IE is not set, then, in this embodiment, the Slave base station 5-2 shall send the Resource Status Update only once.

In this exemplary embodiment, a separate message to stop the Resource Status Update is not needed. Instead, the Master base station 5-1 sends the same request message, with the Reporting Characteristics IE value set to zero. The Slave base station 5-2 shall interpret this message as a request to stop the Resource Status Update reporting, which it will process immediately and acknowledge with a similar value of zero in a corresponding Resource Status Update message.

Where the Resource Status Request message requests event triggered reports for multiple events, it may also specify thresholds for those events. For example, the Master base station 5-1 may request a Slave base station 5-2 to report to it whenever its Total Physical Resource Block usage is above 95%, indicating a near congestion situation. Similarly, the Slave may be asked to report if the downlink transmitted power exceeds a certain threshold value.

In this exemplary embodiment, the Resource Status Request message generated by the Master base station 5-1 may include the "Averaging Time" to specify the measurement interval for producing the information requested by the Master base station 5-1. If this value is not specified, then the Slave base station will apply a default value.

In this exemplary embodiment, the Resource Status Request message generated by the Master base station 5-1 may include a Reporting Time to specify a periodic reporting based on the Master bases station's internal ARM algorithm. If this value is not specified, the Slave base station 5-2 may apply a default value.

As will be understood by those skilled in the art, each base station 5 may control several different cells and, in this embodiment. The Resource Status Request message generated by the Master base station 5-1 may also include the cell Id's of the cells for which it is interested in receiving the resource load information. If this value is not specified, the slave base station 5-2 will report the resource load status of all its cells.

Details of Resource Status Update Message

In this exemplary embodiment, the Resource Status Update message shall include a Reporting Characteristics IE to indicate the reason for the report. A couple of values in the Reporting Characteristics IE could be reserved to indicate congestion in the cell either in the UL or in the DL direction in terms of Physical layer resources or any other type of processing resources. A Resource Status Update message with a congestion indication can also be autonomously sent by Slave base stations 5-2 to the neighbouring Master base stations 5-1 who have requested Resource status updates whenever congestion is detected. Further, the Slave base stations 5-2 can autonomously send the Resource Status Update message when the congestion is resolved. A Resource Status Update message can also be autonomously sent by a Slave base station 5-2 to the neighbouring Master base stations 5-1 who have requested Resource status updates whenever UL interference exceeds a particular threshold in its own cell, thus incorporating the existing procedure "Load Information" in it.

The Resource Status Update message will also include the relevant measurements requested by the Master base station 5-1:

1) Averaged Physical resource block usage for real time traffic on UL based on the Averaging/Reporting Time specified by the Master base station 1;
2) Averaged Physical resource block usage for non-real traffic on UL based on the Averaging/Reporting Time specified by the Master base station 5-1;
3) Averaged Physical resource block usage for real time traffic on DL based on the Averaging/Reporting Time specified by the Master base station 5-1; and
4) Averaged Physical resource block usage for non-real time traffic on DL based on the Averaging/Reporting Time specified by the Master base station 5-1.

As mentioned above, in general, each base station 5 will have both the Master (in Asking Resource Status Information) and Slave (Providing Resource Status Reports) roles. However, a base station 5 may not implement a load balancing algorithm and in this case shall act only as a Slave in providing the Resource Status Reports to neighbouring base stations 5, which may be considered to be mandatory.

Figure 3B:
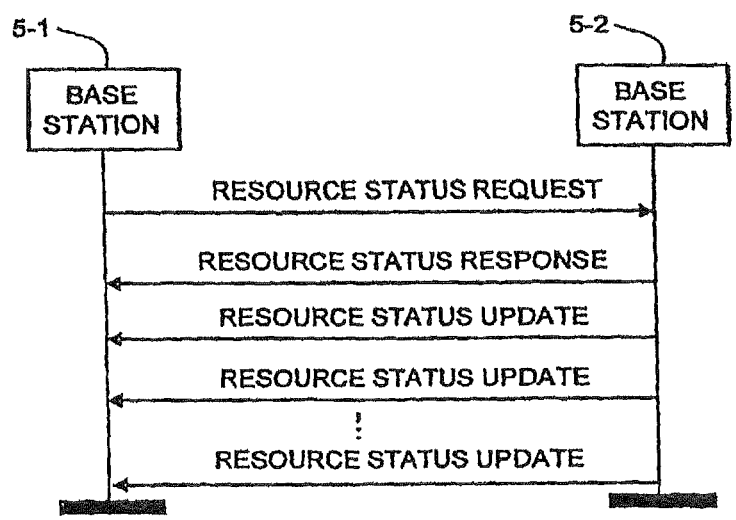
FIG. 3b schematically illustrates another signalling method for signalling the load balancing measurements between two base stations.
Figure 3C:
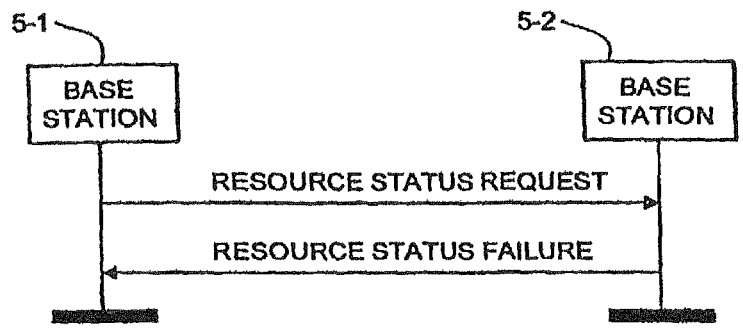
FIG. 3c schematically illustrates a situation where a signalling failure occurs between two base stations.
Figure 3D:
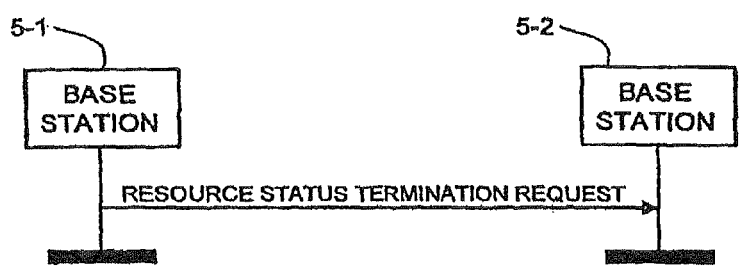
FIG. 3d schematically illustrates one way in which termination may be signalled between two base stations.

In an alternative exemplary embodiment, there could be a more sophisticated procedure where the Slave base station 5-2 responds to a Resource Status Request such as in the manner illustrated in FIG. 3b, where there is a successful initiation and in FIG. 3c, where the initiation failed. The initial failure may be because the Slave base station 5-2 does not support the requested measurements. However, if it is mandatory for each Base station 5 to provide Resource Status update messages to other neighbouring base stations 5, then such a response/failure message may not be needed. In addition, a positive stop or termination message may also be sent to terminate the signalling between the Master and Slave base stations 5 (see, FIG. 3d).

As those skilled in the art will appreciate, with the signalling discussed above, load reporting can be performed based on the Reporting period specified by the Master base station 51, thereby allowing the Master base station 5-1 to effectively utilize the received resource status information even in a multi vendor scenario, where implementation specific algorithms are run in different base stations 5. Furthermore, redundant signalling over the X2 interface 25 can be reduced.

Load Information Procedure

Presently 3GPP Standard document TS 36.423 defines a Load Information Procedure, the purpose of which is to transfer the uplink Interference Overload Indication between intra-frequency neighboring base stations 5 for interference coordination purposes. Overload Indications are sent when the base station 5 experiences too high interference levels in the UL on some resource blocks due to a mobile telephone 3 at the cell edge using high power to transmit UL data. Base stations 5 that receive this message, should in principle, ask the mobile telephone 3 to reduce the UL transmit power that is causing the interference.

A base station 5 initiates the procedure by sending a Load Information message to intra-frequency neighbouring base stations 5. The Load information Procedure is used to send interference overload indications when the base station 5 experiences too high interference levels on some resource blocks.

The Resource Status update procedure described above can incorporate this Load Information Procedure if the Resource Status Update messages can be autonomously sent by the Slave base stations 5-2 to the neighbouring Master base stations 5-1 that have requested the Resource status update and have intra frequency cells whenever the UL interference exceeds a particular threshold in its own cell. Such a merged procedure could be called either a Resource Status Update or Load Information Procedure, whichever is more appropriate.

Associated SON Functionality

Figure 4:
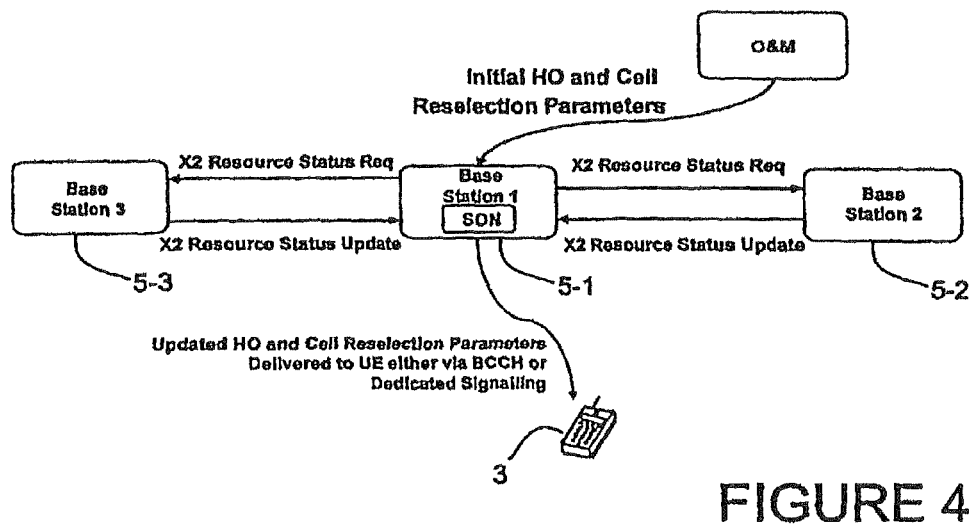
FIG. 4 illustrates the way in which load information within a base station can be used to dynamically control Handover and cell selection parameters.

The load information obtained by the base station 5 in the above manner can be utilized to dynamically control Handover and Cell (Re-)Selection parameters of a cell controlled by the base station 5, through an internal SON entity (which is a self organizing Network that provides ARM functionality within the base station 5). In other words, the load information obtained can be used to control how the base station 5 selects which cell a mobile telephone 5 should be passed to as the telephone 3 roams within the network's coverage area. This is illustrated in FIG. 4.

Cell re-selection parameters that could be updated include:
1. Inter-frequency reselection priorities
2. layer specific offset (How to apply it to the Intra frequency case is FFS (for further study) as it is based on ranking of cells.)

Hand Over parameters that can be configured include:
1. Hysteresis
2. Time to trigger
3. etc.

Modifications and Alternatives

A detailed exemplary embodiment has been described above. As those skilled in the art will appreciate, a number of modifications and alternatives can be made to the above embodiment whilst still benefiting from the inventions embodied therein.

In the above exemplary embodiment, a mobile telephone based telecommunications system was described. As those skilled in the art will appreciate, the signalling and handover techniques described in the present application can be employed in other communications system. Other communications nodes or devices may include user devices such as, for example, personal digital assistants, laptop computers, web browsers, etc.

In the above exemplary embodiments, a number of software modules were described. As those skilled will appreciate, the software modules may be provided in compiled or un-compiled form and may be supplied to the base station or to the mobile telephone as a signal over a computer network, or on a recording medium. Further, the functionality performed by part or all of this software may be performed using one or more dedicated hardware circuits. However, the use of software modules is preferred as it facilitates the updating of base station 5 and the mobile telephones 3 in order to update their functionalities.

Various other modifications will be apparent to those skilled in the art and will not be described in further detail here.

Glossary of 3GPP Terms
LTE—Long Term Evolution (of UTRAN)
eNodeB—E-UTRAN Node B
UE—User Equipment—mobile communication device
DL—downlink—link from base to mobile
UL—uplink—link from mobile to base
MME—Mobility Management Entity
UPE—User Plane Entity
HO—Handover
ALC—Radio Link Control
ARC—Radio Resource Control
ARM—Radio Resource Management
SAE—System Architecture Evolution
C-RNTI—Cell-Radio Network Temporary Identifier
SIB—System Information Block
U-plane—User Plane
X2 Interface—Interface between two eNodeB
S1 Interface Interface between eNodeB and MME
TA—Tracking Area
EPC—Evolved Packet Core
AS—Access Stratum
RNL—Radio Network Layer TNL—Transport Network Layer RACH—Random Access Channel
MU MIMO—Multi-User Multi Input Multi Output
DMRS—Demodulation Reference Signal Format
MCS—Modulation and Coding Scheme The following is a detailed description of the way in which the present inventions may be implemented in the currently proposed 3GPP LTE standard. Whilst various features are described as being essential or necessary, this may only be the case for the proposed 3GPP LTE standard, for example due to other requirements imposed by the standard. These statements should not, therefore, be construed as limiting the present invention in any way.

Introduction

In the RAN1 #51B is meeting, the load balancing mechanism was discussed. A reply LS in [1] has been sent to RAN 2 and RAN 3 to inform the outcomes of the agreements in RAN 1. In this contribution we provide further details about the signalling involved in order to have the achieve the load balancing.

Measurement Definitions

RAN1 has discussed the physical layer measurements needed to support efficient load balancing and have agreed that the measurements of the physical resource block usage in uplink and downlink are relevant for this use case. They have proposed 4 different measurements listed below for this purpose ''' M1 Physical resource block usage for GBR (real time traffic) on UI ,_ M2 Physical resource block usage for non-real traffic on UI ⇒ M3 Physical resource block usage for GBR (real time) traffic on DI ⇒ M4 Physical resource block usage for non-real time traffic on DI All these measurements are defined as a ratio (percentage) of the used PRBs for a type of traffic over the available PRBs in the same direction over a certain time interval, and are measured per cell. Any non-scheduled transmissions and retransmissions should also be counted as used.

Further, RAN 1 believes that it is would be sufficient if this control is done at a periodicity in the order of seconds to minutes, or even at a slower rate depending on the expected traffic fluctuation such as for busy hours.

Details of the signalling for load balancing mechanism is yet to be defined. In the next section we explore different options of how the measured quantities are signalled over X2 interface and what parameters Handover and reselection parameters could be re-configured.

Signalling Over X2

4.1. All eNB Informs Measured Load Information to Other Neighbors

This is the simplest scenario where each eNBs informs measured load information to all the neighbors to which they have an established X2 connection by sending for example: Resource Status Update Message periodically. Alternatively, this information may be piggy-backed on dedicated messages.

As different vendors eNBs may implement different algorithms which would process the Resource Status Update Report at different intervals, using a one fixed interval for reporting may result in reports being sent too frequently and the eNB just discarding large number of these reports. For example if the Load balancing algorithm operates every 5 seconds, a Resource Status Update reporting interval is fixed at say 1 sec then 4 out of 5 reports may be discarded.

4.2. eNB Requests Load Information Selectively from Neighbor eNBs

An eNB may request the neighbouring eNB to send load information in the fashion it likes (based on the implemented ARM algorithm.) For example the requesting eNB may indicate in the Resource Status Request to the neighbouring eNB if it needs Load information to be reported just once, or periodically, or in an event driven fashion whenever any of the corresponding multiple event occurs.

We call this as a Master Slave configuration where the requesting eNB is the master and can request the information in the format it desires.

Details of Resource Status Request Message

Master eNB1 sends an Resource Status Request to Slave eNB2 requesting it to indicate the physical resource block usage either once, or periodically, or event driven manner.

Figure 5:
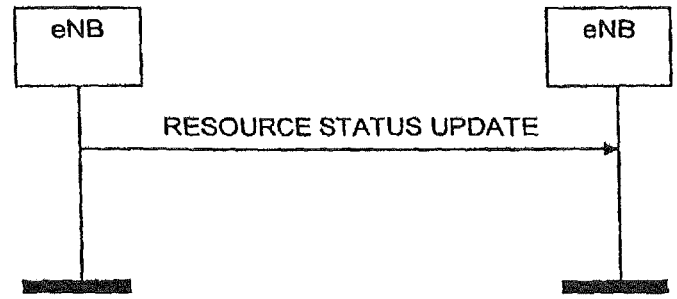
FIG. 5 schematically illustrates a simple resource status update procedure.

Reporting Characteristics IE indicates whether reporting shall be once, or periodically, or event driven, in which case the event is specified. If the reporting characteristics IE is not set, then the Resource Status Update SHALL be sent only once by the slave eNB (see FIG. 5).

Note that a separate message to Stop the Resource Status Update need not be specified. The same request message, with Reporting Characteristics value set to 0, shall be interpreted as a request to stop the Resource Status Update reporting, which shall be processed by the receiver immediately and acknowledged with a similar value of 0 in the corresponding Resource Status Update message In the Resource Status Request message, the reporting characteristics IE would allow the Master eNB to request either periodic or event triggered reports for multiple events and the possibility of providing the thresholds for these events.

In the Resource Status Request message, the Averaging Time could be included by the Master eNB to specify a measurement interval for producing the information requested by Master eNB. If this value is not specified, the slave eNB shall apply a default value In the Resource Status Request message, the Reporting Time could be included by the Master eNB to specify a reporting based on its internal ARM algorithm. If this value is not specified, the slave eNB shall apply a default value In the Resource Status Request message, Master eNB could include the cell Id's of the cells for which it is interested in receiving the resource information. If this value is not specified, the slave eNB shall report the resource status of all the cells.

Details of Resource Status Update Message

Resource Status Update message shall also including Reporting Characteristics IE to indicate the reason for this report.

In Reporting Characteristics IE,—couple of the values could reserved to indicate congestion in the cell either in UL or in DL direction in terms of Physical layer resources or any other type of processing resources. Resource Status Update Report with congestion indication can be autonomously sent by slave eNB to the neighbouring Master eNBs who have requested Resource status update whenever a congestion is detected. Further, slave eNB can autonomously send the Resource Status Update Report when the congestion is resolved. Resource Status Update Report could be autonomously sent by slave eNB the neighbouring Master eNBs who have requested Resource status update whenever UL interference exceeds a particular threshold in its own cell. Thus incorporating the existing procedure Load Information in it.

Averaged Physical resource block usage for GSR (real time traffic) on UL based on the Averaging/Reporting Time specified by Master eNB Averaged Physical resource block usage for non-real traffic on UL based on the Averaging/Reporting Time specified by Master eNB Averaged Physical resource block usage for GSR (real time) traffic on DL based on the Averaging/Reporting Time specified by Master eNB Averaged Physical resource block usage for non-real time traffic on DL based on the Averaging/Reporting Time specified by Master eNB It should be noted that in general each eNB is having both the Master (in Asking Resource Status Information) and Slave (Providing Resource Status Reports) roles. However, an eNB may not implement a load balancing algorithm and in this case shall act only as a slave in providing the Resource Status report to neighbouring eNB which may be considered to be mandatory.

Figure 7A:
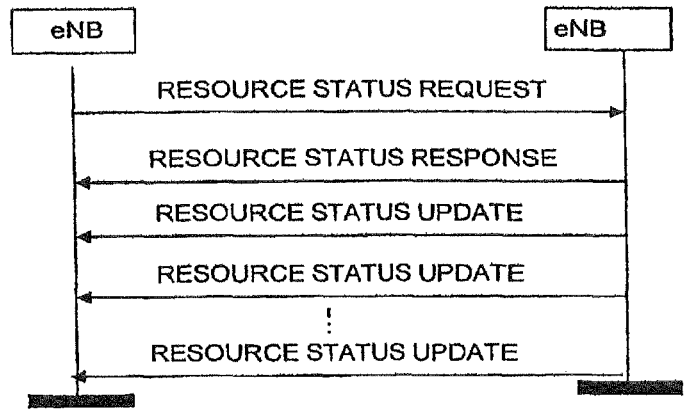
FIG. 7a schematically illustrates a common measurement like resource status update procedure (successful initiation)
Figure 7B:
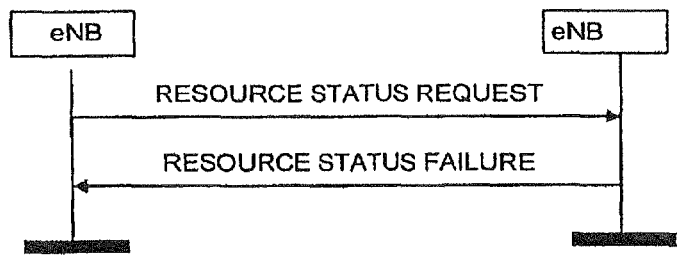
FIG. 7b schematically illustrates a common measurement like resource status update procedure (unsuccessful initiation)
Figure 7C:
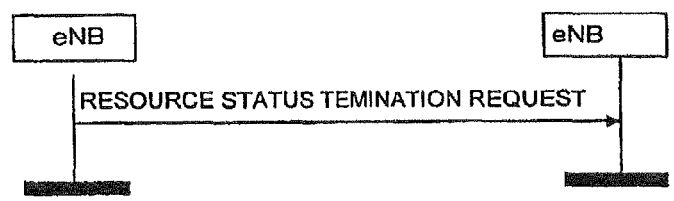
FIG. 7c schematically illustrates a common measurement like resource status update procedure (termination)

Alternatively we could have more sophisticated procedure similar to Common Measurement Procedure defined in UMTS over Iur interface where there is a response to a Resource Status Request such as Resource Status Response as shown in FIGS. 7a, 7b, and 7c Compared to option 2 it provides the eNB to reject the Resource Status Request in case it does not supported a requested measurements.

Figure 6:
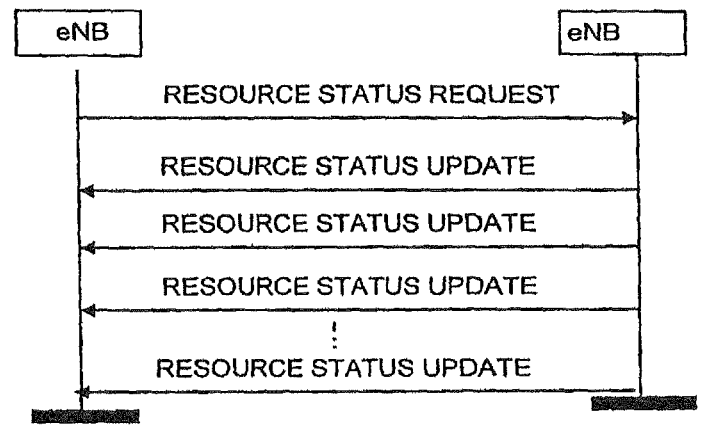
FIG. 6 schematically illustrates a master slave based resource status update procedure.

Such a procedure will require 5 messages as compared to Master Slave Configuration proposed in FIG. 6. However, if it is mandatory for each eNB to provide Resource Status update to other neighbouring eNB then such a response/failure message may not be needed.

Such an options would allow reporting of the load information based on the Reporting period specified by the Master eNB so that it could effectively utilize resource status information in multi vendor scenario allowing the implementation specific algorithms perform efficiently. Furthermore, the redundant signalling over X2 could be reduced.

Relation to Load Information Procedure

Presently Load information Procedure is defined in [3]. The purpose of the Load indication procedure is to transfer the uplink Interference Overload Indication between intra-frequency neighboring eNodeBs for interference coordination purpose.

Figure 8:
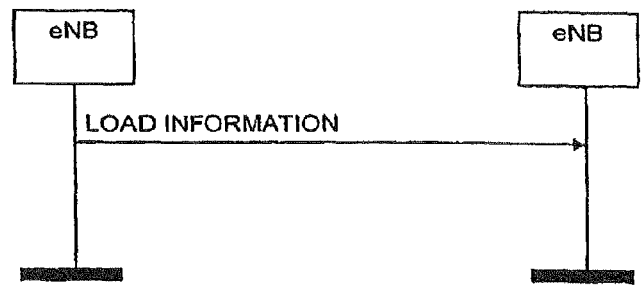
FIG. 8 schematically illustrates a load information procedure.

An eNodeB initiates the procedure by sending LOAD INFORMATION message to intra-frequency neighbouring eNodeBs (see, FIG. 8). The LOAD INFORMATION message can carry interference overload indication. The Load indication procedure shall be used to send interference overload indication when the eNB experiences too high interference level on some resource blocks.

The proposed Resource Status update procedure can incorporate the above procedure if the Resource Status Update Report could be autonomously sent by slave eNB to the neighbouring Master eNBs who have requested Resource status update and have intra frequency cells whenever UL interference exceeds a particular threshold in its own cell. Hence for the sake of simplicity we propose to merge these to procedures together. We could call the merged procedure either as Resource Status Update or Load Information Procedure, whichever seems more appropriate.

Associated SON Functionality

Figure 9:
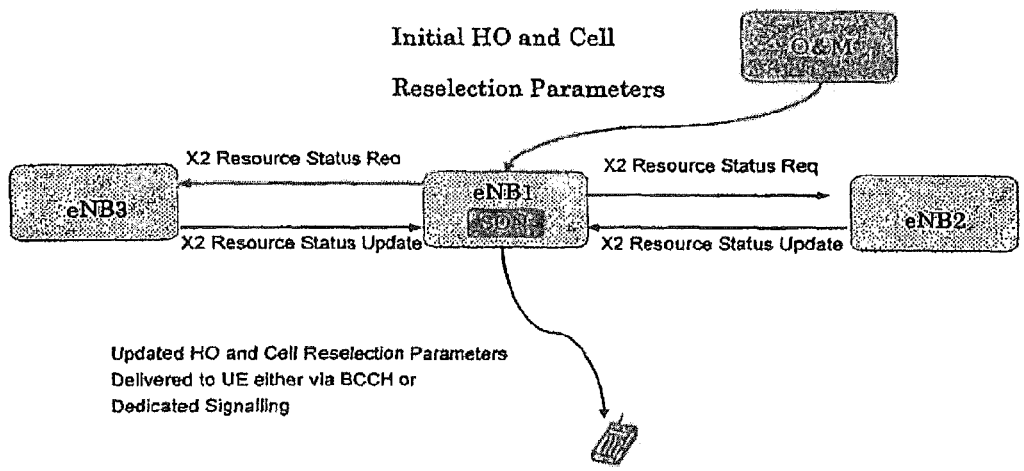
FIG. 9 illustrates a mechanism in which load information within an eNB can be utilized to dynamically control Handover and Cell (Re-) Selection parameters.

The Load Information within the eNB can be utilized to dynamically control Handover and Cell (Re-) Selection parameters of the cell controlled by eNB through internal SON entity. The mechanism is shown in FIG. 9.

Cell re-selection parameters that could be updated are. [How to apply it to Intra frequency case is FFS as it is based in ranking of cells.]
3. Inter-frequency reselection priorities
4. layer specific offset
Hand Over parameters that can be configured are
1. Hysteresis
Time to trigger
3. etc.

CONCLUSIONS

In this contribution we discuss various options for exchanging information about the Resource Status between eNBs. We believe that Master/Slave kind configuration would be very flexible in providing the resource status reports to the implementation specific ARM algorithms in a multi-vendor scenario and should be adopted. We urge RAN 3 to agree on the proposed Master/Slave kind of reporting option and the associated text proposal in [4] for X2AP specs.

Further we also discuss the handover and Cell Reselection parameters that could be optimized in the associated SON functionality and if agreeable some details could be captured in Stage 2 TS.

REFERENCES

[1] R1-080601, Reply LS on Load balancing, RAN 1
[2] 25.423 3GPP Specification for RNSAP
[3] 36.423 3GPP Specifications for X2AP
[4] R3-08XXXX Text procedure for Resource Status Update Procedure.

This application is based upon and claims the benefit of priority from United Kingdom patent application No. 0802023.2, filed on Feb. 4, 2008, the disclosure of which is incorporated herein in its entirety by reference.

The invention claimed is:

1. A method performed by a EUTRAN base station, the method comprising:
generating a request for resource status information, wherein said request carries information that defines a future timing at which one or more update messages including said resource status information should be sent;
sending the generated request to a neighboring EUTRAN base station;
receiving one or more resource status update messages sent from the neighboring EUTRAN base station in response to the request for resource status information in accordance with the future timing defined by said information carried by said request; and
performing load balancing operations in dependence upon the received one or more resource status update messages.

2. A method according to claim 1, further comprising obtaining load balancing measurements for resources associated with the requesting base station and wherein said performing performs said load balancing operations in dependence upon the obtained load balancing measurements and the received one or more resource status update messages.

3. A method according to claim 2, wherein said obtaining obtains said measurements by making the measurements.

4. A method according to claim 1, wherein said generated request is for requesting said resource status information at a defined event.

5. A method according to claim 4, wherein said generated request is for requesting the neighboring base station to transmit a resource status report when usage of a resource by the neighboring base station exceeds a defined threshold.

6. A method according to claim 4, wherein said generated request is for requesting the neighboring base station to transmit a resource status report when the uplink interference level exceeds a defined threshold.

7. A method according to claim 4, wherein said generated request is for requesting said resource status information at any of a plurality of defined events.

8. A method according to claim 1, wherein said generated message includes data identifying an averaging time specifying a measurement interval for producing the requested information.

9. A method according to claim 1, wherein said base station is operable to dynamically control Handover and Cell reselection parameters in dependence upon the one or more received resource status update messages.

10. A method according to claim 9, wherein said cell reselection parameters include at least one of Inter-frequency reselection priorities and layer specific offset.

11. A method according to claim 9, wherein said Handover parameters include at least one of hysteresis and time to trigger.

12. A method according to claim 1, wherein said request and response are communicated between the neighboring base stations over an X2 interface.

13. A mobile terminal configured for handover, from a EUTRAN base station operable to perform a method according to claim 1, and in accordance with said load balancing operations performed by said EUTRAN base station.

14. A communication system comprising:
a EUTRAN base station adapted to perform a method according to claim 1; and
a mobile terminal configured for handover from said EUTRAN base station in accordance with said load balancing operations performed by said EUTRAN base station.

15. A non-transitory computer-readable storage medium tangibility embodying a program of machine-readable instructions executable by a digital processing apparatus to perform the control method of claim 1.

16. A method performed by a EUTRAN base station, the method comprising:
receiving a request for resource status information from a neighboring EUTRAN base station, wherein said request carries information that defines a future timing at which one or more update messages including said resource status information should be sent;
obtaining one or more load balancing measurements for resources associated with the base station;
generating one or more resource status update messages including the one or more load balancing measurements; and
sending the generated one or more resource status update messages to the neighboring EUTRAN base station in accordance with the future timing defined by said information carried by said request.

17. A method according to claim 16, wherein said generating generates and sends said one or more resource status update messages in accordance with requirements defined by the neighboring base station in said received request.

18. A method according to claim 16, wherein said obtaining obtains said measurements by making the measurements.

19. A method according to claim 16, wherein said further request comprises a field set at a defined value for stopping the transmission of further status update messages, and comprising stopping transmission of status update messages in response thereto.

20. A method according to claim 16, wherein said received request is for requesting said resource status information at a defined event.

21. A method according to claim 20, wherein said received request is for requesting the base station to send a resource status report when usage of a resource by the base station exceeds a defined threshold.

22. A method according to claim 20, wherein said received request is for requesting the base station to send a resource status report when the uplink interference level exceeds a defined threshold.

23. A method according to claim 20, wherein said received request is for requesting said resource status information at any of a plurality of defined events.

24. A method according to claim 16, wherein said obtaining obtains said load balancing information over a measurement interval defined by the received request.

25. A EUTRAN base station, comprising:
means for generating a request for resource status information, wherein said request carries information that defines a future timing at which one or more update messages including said resource status information should be sent;
means for sending the generated request to a neighboring EUTRAN base station;
means for receiving one or more resource status update messages sent from the neighboring EUTRAN base station in response to the request for resource status information in accordance with the future timing defined by said information carried by said request; and
means for performing load balancing operations in dependence upon the received one or more resource status update messages.

26. A EUTRAN base station, comprising:
a request generator operable to generate a request for resource status information, wherein said request carries information that defines a future timing at which one or more update messages including said resource status information should be sent;
a transceiver operable to transmit the generated request to a neighboring EUTRAN base station and operable to receive one or more resource status update messages sent from the neighboring EUTRAN base station in response to the request for resource status information in accordance with the future timing defined by said information carried by said request; and
a controller operable to perform load balancing operations in dependence upon the received one or more resource status update messages.

27. A EUTRAN base station, comprising:
means for receiving a request for resource status information from a neighboring EUTRAN base station, wherein said request carries information that defines a future timing at which one or more update messages including said resource status information should be sent;
means for obtaining one or more load balancing measurements for resources associated with the base station;
means for generating one or more resource status update messages including the one or more load balancing measurements; and
means for sending the generated one or more resource status update messages to the neighboring EUTRAN base station in accordance with the future timing defined by said information carried by said request.

28. A EUTRAN base station, comprising:
transceiver operable to receive a request for resource status information from a neighboring EUTRAN base station, wherein said request carries information that defines a future timing at which one or more update messages including said resource status information should be sent;
a controller operable to obtain one or more load balancing measurements for resources associated with the base station; and
a resource status update message generator operable to generate one or more resource status update messages including the one or more load balancing measurements,
wherein said transceiver is operable to transmit the generated one or more resource status update messages to the neighboring EUTRAN base station in accordance with the future timing defined by said information carried by said request.

* * * * *

UNITED STATES PATENT AND TRADEMARK OFFICE
CERTIFICATE OF CORRECTION

PATENT NO.       : 8,886,192 B2
APPLICATION NO.  : 13/678875
DATED            : November 11, 2014
INVENTOR(S)      : Jagdeep Singh Ahluwalia It is certified that error appears in the above-identified patent and that said Letters Patent is hereby corrected as shown below:

Title Page
Page 2, Column 2, Line 1: *OTHER PUBLICATIONS*: Delete "lur" and insert -- iur --
Page 2, Column 2, Line 7: *OTHER PUBLICATIONS*: Delete "Anapolis," and insert -- Antipolis, --
Page 2, Column 2, Line 10: *OTHER PUBLICATIONS*: Delete "Seul," and insert -- Seoul, --
Page 2, Column 2, Line 19: *OTHER PUBLICATIONS*: Delete "Anapolis Valibonne," and
      insert -- Antipolis Valbonne, --
Page 2, Column 2, Line 22: *OTHER PUBLICATIONS*: Delete "Sevilla," and insert -- Seville, --
In the Drawings
Drawing Sheet 6 of 7, Figure 7C: Delete "TEMINATION" and insert -- TERMINATION --
In the Specification
Column 1, Line 63: Delete "COMA" and insert -- CDMA --
Column 4, Line 50: Delete "(ARM)" and insert -- (RRM) --
Column 5, Line 29: After "station" insert -- 5-2 --
Column 5, Line 33: Delete "ARM" and insert -- RRM --
Column 6, Line 3: Delete "1;" and insert -- 5-1; --
Column 6, Line 36: Delete "51," and insert -- 5-1, --
Column 7, Line 6: Delete "ARM" and insert -- RRM --
Column 7, Line 58: Delete "ALC" and insert -- RLC --
Column 7, Line 59: Delete "ARC" and insert -- RRC --
Column 7, Line 60: Delete "ARM" and insert -- RRM --
Column 8, Line 32: Delete "UI" and insert -- UL --
Column 8, Line 34: Delete "UI" and insert -- UL --
Column 8, Line 36: Delete "DI" and insert -- DL --
Column 8, Line 38: Delete "DI" and insert -- DL --
Column 9, Line 7: Delete "ARM" and insert -- RRM --
Column 9, Line 45: Delete "ARM" and insert -- RRM --
Column 10, Line 6: Delete "GSR" and insert -- GBR --
Column 10, Line 12: Delete "GSR" and insert -- GBR --

Signed and Sealed this
Tenth Day of November, 2015

Michelle K. Lee
*Director of the United States Patent and Trademark Office*

CERTIFICATE OF CORRECTION (continued)
U.S. Pat. No. 8,886,192 B2

In the Specification
Column 10, Line 28: Delete "lur" and insert -- iur --
Column 11, Line 13: Delete "Time" and insert -- 2. Time --
Column 11, Line 22: Delete "ARM" and insert -- RRM --